United States Patent
Phillips

[15] 3,685,685
[45] Aug. 22, 1972

[54] PLASTIC-METAL CAN
[72] Inventor: James A. Phillips, Monrovia, Calif.
[73] Assignee: Standard Oil Company, Chicago, Ill.
[22] Filed: March 9, 1971
[21] Appl. No.: 122,373

Related U.S. Application Data
[63] Continuation-in-part of Ser. No. 812,843, April 2, 1969, abandoned.

[52] U.S. Cl. .................................................. 220/67
[51] Int. Cl. .................................................. B65d 7/42
[58] Field of Search .220/67, 66; 113/120 XY, 120 Y

[56] References Cited

UNITED STATES PATENTS

| | | | |
|---|---|---|---|
| 3,144,375 | 8/1964 | Turnage et al. | 220/66 X |
| 3,410,939 | 11/1968 | Driza et al. | 220/67 X |
| 3,491,936 | 1/1970 | Fox | 220/67 X |
| 3,580,464 | 5/1971 | Griffith | 220/67 X |

Primary Examiner—George E. Lowrance
Assistant Examiner—James R. Garrett
Attorney—Arthur G. Gilkes, William T. McClain and Robert W. Fletcher

[57] ABSTRACT

A plastic-metal can comprising a plastic container and a metal cover, said cover and container being double seam sealed together, said double seam comprising: at least two points where the plastic of the double seam is compressed to a thickness less than one-half of its original thickness before seaming, the plastic container being further defined in that it is fabricated from a plastic selected from plastics having a modulus of elasticity which is between about $0.10 \times 10^6$ and about $0.40 \times 10^6$ psi.

7 Claims, 3 Drawing Figures

PATENTED AUG 22 1972

3,685,685

INVENTOR
JAMES A. PHILLIPS

BY  Robert W. Fletcher
ATTORNEY

3,685,685

PLASTIC-METAL CAN

RELATED APPLICATION

This application is a continuation-in-part of U.S. Application S.N. 812,843, filed April 2, 1969, now abandoned.

BACKGROUND OF THE INVENTION

Tin-plated steel cans-"tin cans"-have long been used to pack and ship foods, petroleum products and a variety of other materials. The term "can" as used herein means a container and a cover sealed together to form an air-tight vessel. Tin cans are ready for storage or shipping after their containers have been filled and covers sealed thereon. Generally the covers are sealed to the containers with double seam seals making them air-tight. Many times the double seam seals are reinforced with solder, involving additional process steps and expense.

Recently, plastics technologists have come forth with the idea that plastic containers sealed with metal covers could be substituted for metal cans; however, many problems have arisen in effectively sealing the metal covers and plastic containers. A single seam seal was first used and was found to be unsuccessful since it was not leakproof. Double seam sealing was then attempted using metal covers and composite containers, that is, containers comprising two different materials, usually paper laminated with plastic. Such cans have been found to be only moderately successful since they are limited in their applications. One particular problem with such cans is that the metal top cuts through the composite container sidewall during the sealing operation. Another problem is that, during shipment cans land on their seals and are deformed to the extent that the product leaks out. Such leaking results in loss of product as well as damage to labels of adjacent cans.

SUMMARY OF THE INVENTION

The invention described herein is a plastic-metal can comprising a plastic container and a metal cover, said cover and container being double seam sealed together, said double seam comprising: at least two points where the plastic of the double seam is compressed to a thickness less than one-half of its original thickness before seaming, the plastic container being further defined in that it is fabricated from a plastic selected from plastics having a modulus of elasticity which is between about $0.10 \times 10^6$ and about $0.40 \times 10^6$ psi. Plastic materials suitable for use in the invention of this application include high density polyethylene, polypropylene and acrylonitrile-butadiene-styrene copolymers (ABS). The type of plastic material used is not critical so long as it has certain properties further defined hereinafter. If the plastic material of the can sidewall has a modulus of elasticity which is between about $0.10 \times 10^6$ and about $0.40 \times 10^6$ psi, the double seam between the plastic container and the metal top is especially effective to prevent can loss due to deformation of the seal area. Such plastic materials having a modulus of elasticity in the above range have been found to respond, that is, assume their original shape after deformation occurs, remarkably well. The seal is thus maintained, since even though the metal cover and plastic container are deformed, and the metal cover remains deformed, the plastic material attempts to respond into its original position, thereby filling any cracks, crevices or leakage channels.

The plastic container has the advantages of being lighter in weight and less expensive than a comparable size of tin can, and can be conveniently tapered so as to nest with other such containers when stacked empty, and, thus, is shipped at low cost. The plastic container eliminates the need for a sealer material to effect an air-tight seal when it is double seam sealed to metal covers. No modification of present canning equipment is needed to use the new plastic container, and one operation, soldering, can be eliminated by use of such a plastic container.

PREFERRED EMBODIMENTS

Figure 1:
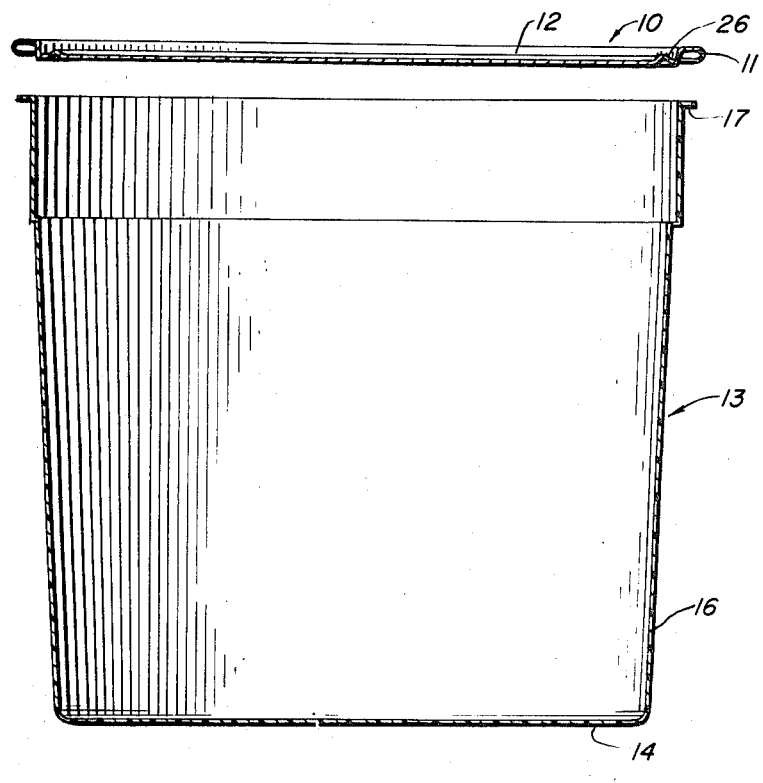
FIG. 1 is a cross-sectional elevational view of the metal cover and plastic container of this invention.
Figure 2:
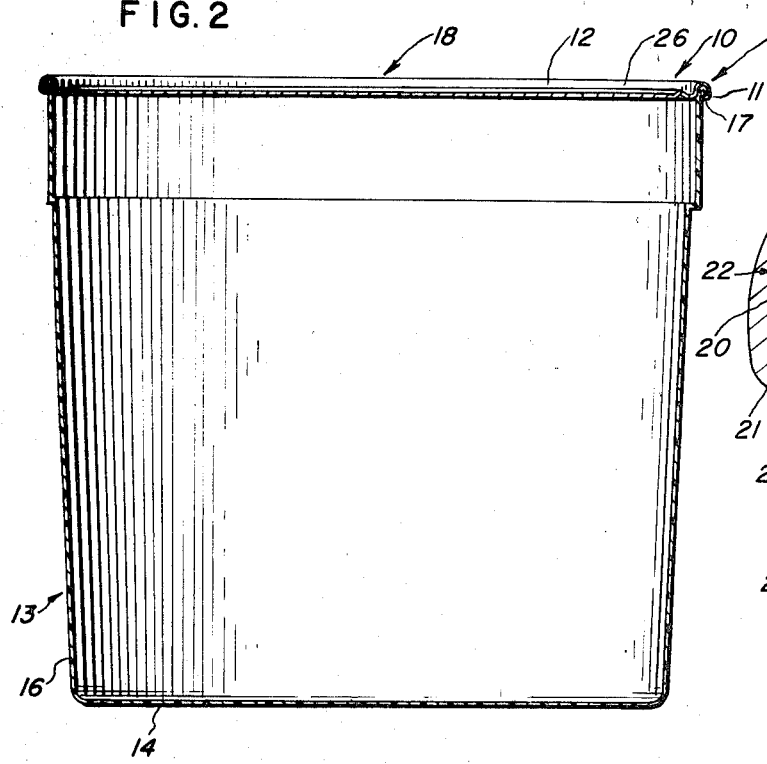
FIG. 2 is a cross-sectional elevational view of the metal cover and plastic container of FIG. 1 double seam sealed together to form the plastic-metal container of this invention.

The plastic-metal can of this invention is comprised of a metal cover 10 and a plastic container 13. Metal cover 10 is comprised of a peripheral curved flange 11 attached to circular lid portion 12. Plastic container 13 is comprised of bottom 14, sidewall 16 and upper radial flange 17.

Figure 3:
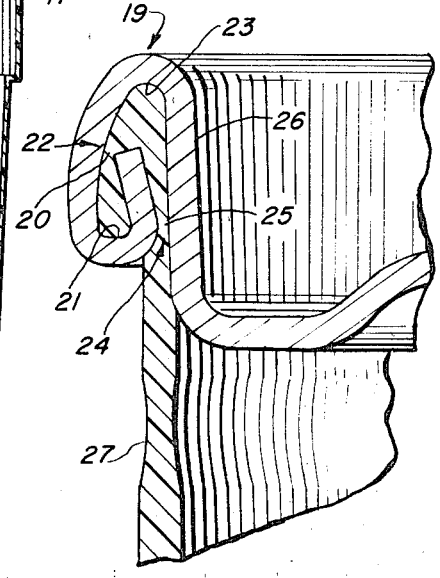
FIG. 3 is an enlarged partial cross-sectional view of the double seam of FIG. 2.

To form the plastic-metal can 18 of this invention metal cover 10 is double seam sealed to plastic container 13. Double seam 19 of this invention is best seen in FIG. 3. Double seam 19 is comprised of a first crimp 21 and seal 22 and a second crimp 23 and seal 24. To form the double seam of this invention metal cover 10 is placed on top of plastic container 13 and peripheral curved flange 11 is curled and compressed to sandwich radial flange 17. This curling and compressing of peripheral curved flange 11 results in an air-tight seal being formed between the inner surface of curved flange 11 and radial flange 17. The maximum compression occurs at point 20 which constitutes the major sealing area of the first crimp and seal. Of course, sealing, in fact, occurs all along the interface between curved flange 11 and radial flange 17. Next, the metal cover 10 and radial flange 17 are curled and compressed at a point radially inwardly from the sandwiched portion of the first crimp and seal. The result of curling and compressing metal cover 10 and radial flange 17 a second time is to form a second crimp 23 and seal 24. In this case, however, a portion of sidewall 16 forms part of seal 24. This portion of sidewall 16 is compressed to less than one-half of its original thickness before compression. The point of maximum compression occurs at point 25, although sealing occurs along the entire interface between curved flange 11 and radial flange 17 as well as sidewall 16 and lid wall 26.

Optionally, a thinner sidewall portion 27 may be fabricated in container sidewall 16. This thinner sidewall portion 27 flexes more easily than the adjacent sidewall portions, and, due to its proximity to point 25, it tends to reduce flexing at point 25. Thus, the possibility of fatigue failure of sidewall 16 at point 25 is reduced.

It is important that the plastic container made in accordance with this invention be comprised of a material which has a modulus of elasticity in the range between about $0.10 \times 10^6$ and about $0.40 \times 10^6$ psi. Such materials have been found to respond, that is, assume their original shape almost 100 percent after being deformed to a very great extent. This nearly complete response is an essential property for a plastic material which is to be used for a container sealed with a metal cover. Such response allows the plastic material, which forms a part of the double seam with the metal cover, to maintain an air-tight seal even after very severe deformation. Plastic materials with a modulus of elasticity below the range indicated are too soft to be used to form generally useful plastic containers. Plastic materials with a modulus of elasticity above the preferred range are too hard and brittle to be effectively double seam sealed in combination with a metal cover. The following table shows the modulus of elasticity of various resinous materials considered for containers compared to aluminum and tin-plated steel, which are suitable metals for can covers.

| Material | Polyvinyl Chloride | High density Polyethylene | Low density Polyethylene | Polyester | Polyamide |
|---|---|---|---|---|---|
| Modulus of Elasticity psi $\times 10^6$ | 0.50–0.70 | 0.120 | 0.035 | 0.60 | 0.40 |

| Vinylidene Chloride | Acrylonitrile butadiene-sytrene copolymers | Polypropylene | Aluminum | Tin-plated Steel |
|---|---|---|---|---|
| 0.055–0.08 | 0.18–0.45 | 0.30 | 10.0 | 30.0 |

The modulus of elasticity is not a measure of the response of a material; however, a modulus of elasticity in the preferred range does indicate that the material may have essentially complete response after deformation. It should be noted that in the case of acrylonitrile-butadiene-styrene copolymers (ABS), not all are useful. This is to be expected since, as shown in the table, some compositions of ABS have a modulus of elasticity above about $0.40 \times 10^6$ psi. Also some ABS copolymers are not suitable because they become stressed and subject to extraordinary chemical attack when double seamed. It should also be noted that polyamide has a modulus of elasticity which is in the upper limit of the preferred range; however, small amounts of water included in the polyamide can lower its modulus of elasticity so that it is in the middle of the preferred range.

The thickness of the metal cover and the radial flange can vary over a wide range with the only limitation being that the peripheral curved flange of the cover and radial flange of the container must be proportionate in size so that they can be double seamed together. The thickness of the metal comprising the cover may range between 5.0 and 500 mils, with 30 mils being preferred. Correspondingly, the thickness of the radial flange of the container can range between 5.0 and 500 mils with 30 mils being preferred. Also the thickness of the container sidewall can vary over a wide range. Generally the container sidewall ranges between 5.0 and 500 mils with about 80 mils being preferred.

Another method of expressing the invention of this disclosure is to present it in terms of a preferred ratio between the modulus of elasticity of the plastic comprising the container and the modulus of elasticity of the metal comprising the cover. Such a preferred ratio for this invention is a ratio of between about $0.33 \times 10^{-2}$ and about $4.0 \times 10^{-2}$. More specifically the ratio should be between about $1.0 \times 10^{-2}$ and about $4.0 \times 10^{-2}$ when the metal cover is aluminum, and between about $0.33 \times 10^{-2}$ and about $1.33 \times 10^{-2}$ when the metal cover is tin-plated steel. This ratio is important since plastic materials with lower moduli of elasticity, which would make the ratio fall above the preferred range, are too soft and spongy to co-act effectively with the metal cover to provide a leakproof air-tight seal, and plastic materials with higher moduli of elasticity, which would make the ratio fall below the preferred range, do not respond well enough to maintain a permanent leakproof air-tight seal. The plastic material used in conjunction with metal covers must not be so soft and spongy that it does not exert pressure on the portion of the metal cover with which it co-acts when double seam sealed thereto, yet, at the same time, cannot be so hard and inflexible that the elasticity of the metal is entirely responsible for maintaining the seal. The proper balance can only be accomplished when the ratio of the moduli of elasticity of the container material to the cover material is within the above range.

EXAMPLE I

A plastic container comprised of acrylonitrile-butadiene-styrene copolymers, having a modulus of elasticity in the range of about $0.10 \times 10^6$ and about $0.40 \times 10^6$ psi, was placed in a tin can double seam sealing machine and a tin-plated steel cover, having no sealer material, was then double seam sealed onto it. The resulting double seam is shown in the drawings. The resulting can was found to be suitable for packaging various foods and petroleum products. The seal formed was air-tight and the plastic container was not cut or damaged during the sealing operation.

EXAMPLE II

Plastic containers comprised of high density polyethylene or propylene having a modulus of elasticity in the range of between about $0.10 \times 10^6$ and about $0.40 \times 10^6$ psi, were substituted for the plastic container of Example I in similar trials. The tin-plated steel and aluminum covers were double seam sealed onto these containers according to the process described in Example I. The resulting plastic-metal cans were also found to be very effective for containing various foods and petroleum products.

The applicability generally to canning liquid and solid materials with the containers of this invention is apparent from the above examples.

Having thus described my invention what I claim is:
1. A plastic-metal can comprising a plastic container and a metal cover, said cover and container being double seam sealed together, said double seam comprising:

at least two circumferential areas where the plastic of the double seam is compressed to a thickness less than one-half of its original thickness before seaming, the plastic container being further defined in that it is fabricated from a plastic selected from plastics having a modulus of elasticity which is between about $0.10 \times 10^6$ and about $0.40 \times 10^6$ psi.

2. A plastic-metal can comprising a plastic container and a metal cover, said cover and container being double seam sealed together, said double seam having a first crimp and seal and a second crimp and seal, the plastic of the double seam in the first crimp and seal being compressed, at the point of maximum compression, to a thickness of less than one-half of its original thickness before seaming, and the plastic of the double seam in the second crimp and seal being compressed, at the point of maximum compression, to a thickness of less than one-half of its original thickness before seaming, the plastic container being further defined in that it is fabricated from a plastic selected from plastics having a modulus of elasticity which is between about $0.10 \times 10^6$ and about $0.40 \times 10^6$ psi.

3. A plastic-metal can comprising a plastic container terminating in an upper radial flange, and a metal cover having a peripheral curved flange, said cover and container being double seam sealed together with a double seam having a first crimp and seal formed by curling and compressing said peripheral curved flange of said cover to sandwich said radial flange of said container, and a second crimp and seal formed by curling and compressing said cover and radial flange at a point radially inwardly from said sandwiched portion, said plastic of said container being compressed, at the point of maximum compression, to a thickness of less than one-half of its original thickness before seaming in both said first and second crimp seals, the plastic container being further defined in that it is fabricated from a plastic selected from plastics having a modulus of elasticity which is between about $0.10 \times 10^6$ and about $0.40 \times 10^6$.

4. The plastic-metal can of claim 3 wherein the ratio of the modulus of elasticity of the plastic comprising the container to the modulus of elasticity of the metal comprising the cover is between about $0.33 \times 10^{-2}$ and about $4.0 \times 10^{-2}$.

5. The plastic-metal can of claim 3 wherein the plastic comprising the container is selected from polymers and copolymers of the group consisting of high density polyethylene, polypropylene and acrylonitrile butadiene styrene, and the metal comprising the cover is selected from the group consisting of tin-plated steel and aluminum.

6. The plastic-metal can of claim 3 wherein the metal cover is aluminum and the ratio of the modulus of elasticity of the plastic comprising the container to the modulus of elasticity of the aluminum is between about $1.0 \times 10^{-2}$ and about $4.0 \times 10^{-2}$.

7. The plastic-metal can of claim 3 wherein the metal cover is tin-plated steel and the ratio of the modulus of elasticity of the plastic comprising the container to the modulus of elasticity of the tin-plated steel is between about $0.33 \times 10^{-2}$ and about $1.33 \times 10^{-2}$.

* * * * *